United States Patent [19]

Merrick

[11] Patent Number: 5,392,913
[45] Date of Patent: Feb. 28, 1995

[54] STORAGE HOLDER DEVICE

[76] Inventor: William Merrick, N606 Wishing Well Rd., Ft. Atkinson, Wis. 53538

[21] Appl. No.: 89,484

[22] Filed: Jul. 19, 1993

[51] Int. Cl.⁶ ............................................. B65D 85/57
[52] U.S. Cl. ................................. 206/454; 206/308.1; 206/308.3; 206/309
[58] Field of Search .............................. 206/307-313, 206/425, 444, 456, 454

[56] References Cited

U.S. PATENT DOCUMENTS

| | | |
|---|---|---|
| 3,258,126 | 6/1966 | Frey . |
| 3,279,470 | 10/1966 | Neilsen . |
| 3,899,842 | 8/1975 | Schneider . |
| 4,035,938 | 7/1977 | Neilsen . |
| 4,165,575 | 8/1979 | Neilsen . |
| 4,426,007 | 1/1984 | Beleckis . |
| 4,549,658 | 10/1985 | Sfikas . |
| 4,641,897 | 2/1987 | Long . |
| 4,667,819 | 5/1987 | Lu . |
| 4,676,374 | 6/1987 | Wilkins ................................ 206/444 |
| 4,724,956 | 2/1988 | Ozeki ................................... 206/307 |
| 4,776,482 | 10/1988 | Wolters . |
| 4,778,047 | 10/1988 | Lay . |
| 4,781,292 | 11/1988 | Sacherman . |
| 4,848,574 | 7/1989 | Murphy et al. ..................... 206/425 |
| 4,884,691 | 12/1989 | Behrens et al. .................... 206/425 |
| 4,889,419 | 12/1989 | Kite . |
| 4,940,142 | 7/1990 | Behrens . |
| 5,027,950 | 7/1991 | Gutierrez . |
| 5,197,600 | 3/1993 | Garcia ................................. 40/379 |

Primary Examiner—Jimmy G. Foster
Attorney, Agent, or Firm—LaValle D. Ptak

[57] ABSTRACT

A storage holder for computer disks, CDs, records, tape cassettes and the like is formed of a single unitary piece of molded plastic. The holder itself has a rectangular main body. A projecting shelf is located adjacent the bottom of the main body, with a pair of spaced-apart resilient fingers biased inwardly toward the main body member. First and second guides, in the form of raised ribs, pins or flanges, extend along at least a portion of each of the sides of the storage holder; so that when a relatively thin flat object, such as a computer disk, CD or the like, is placed in the storage holder, the resilient fingers bias it against the main body. The shelf at the bottom supports the bottom of the object being stored, and the ribs along the sides provide lateral support. An object, such as a computer disk, CD or the like, readily may be inserted into the storage holder and removed therefrom. A provision is made at the bottom of the storage holder for facilitating pivotal mounting of the storage holder in a container, along with other storage holders.

16 Claims, 6 Drawing Sheets

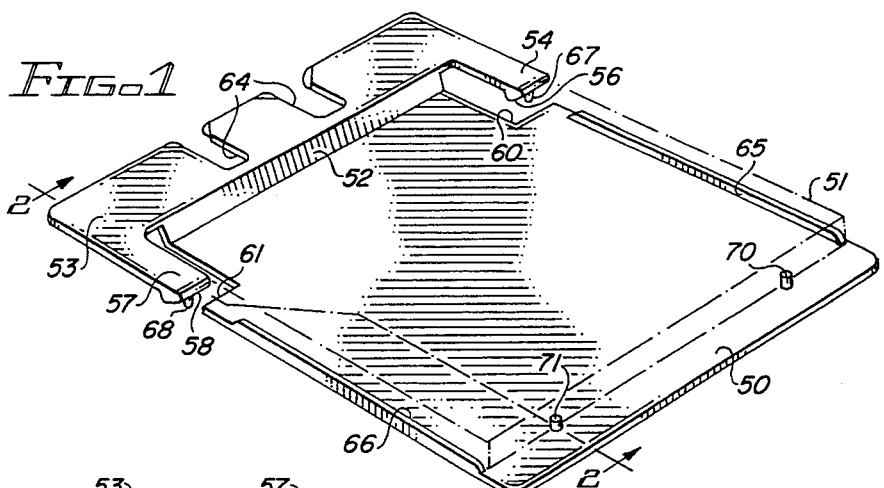
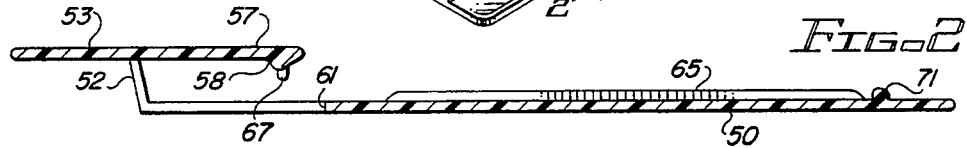
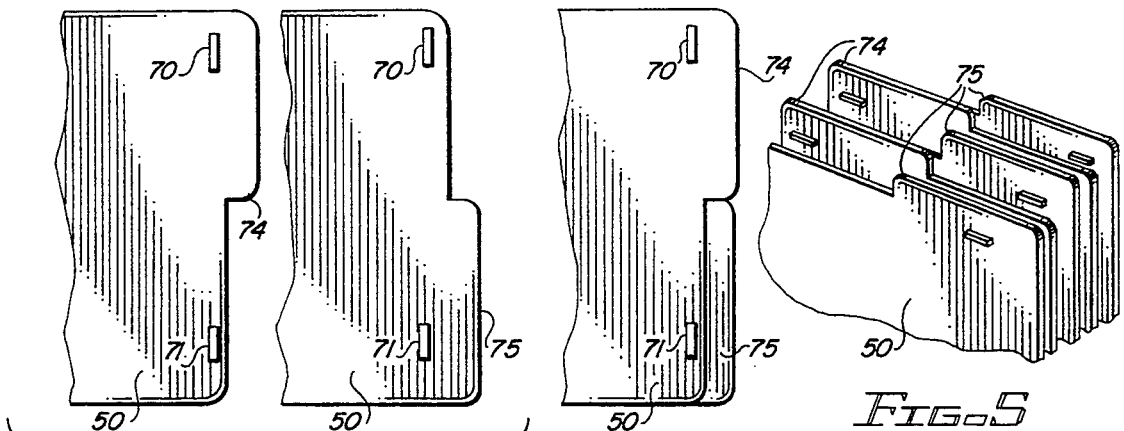
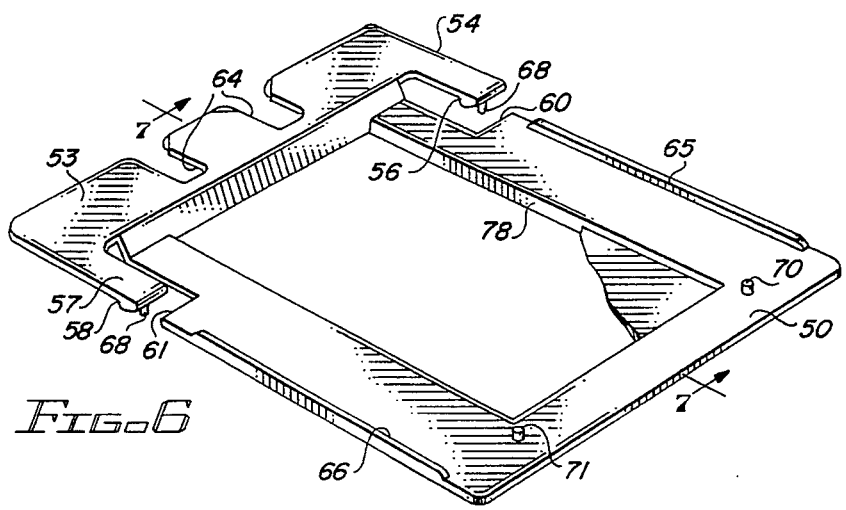

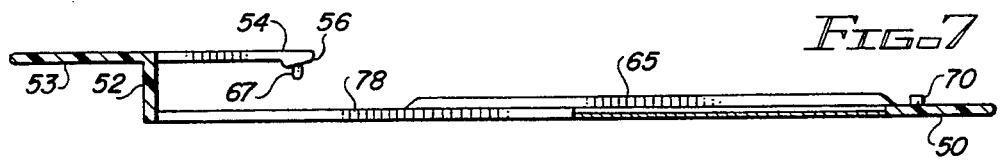
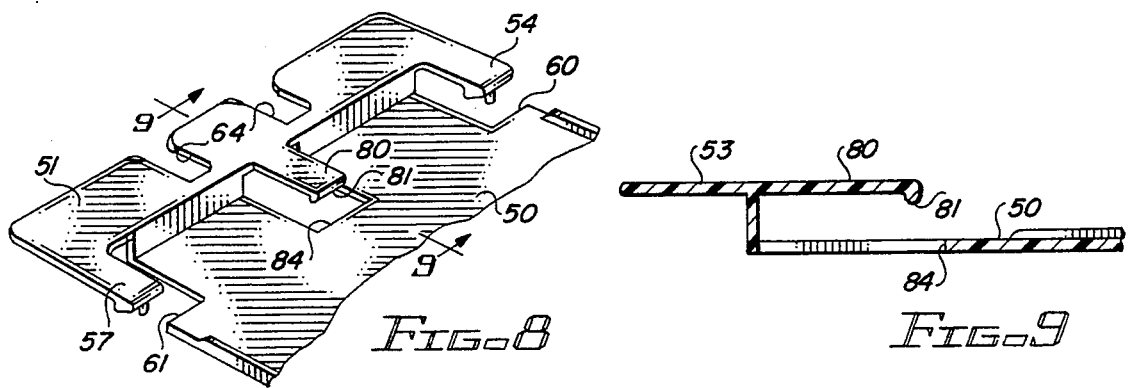
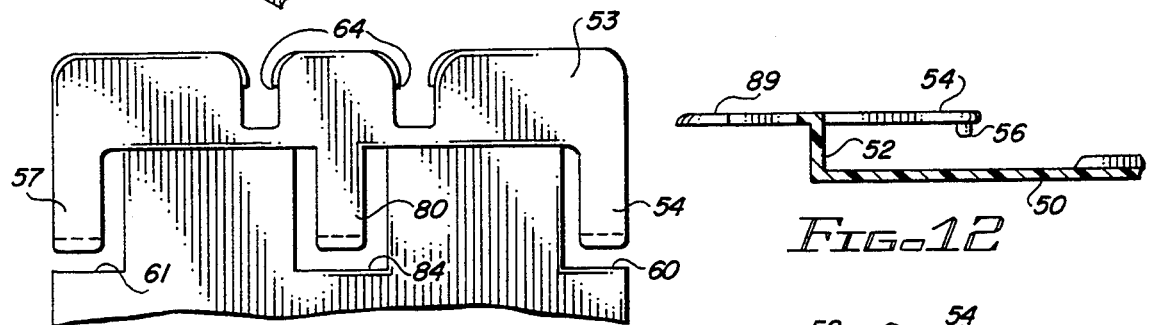
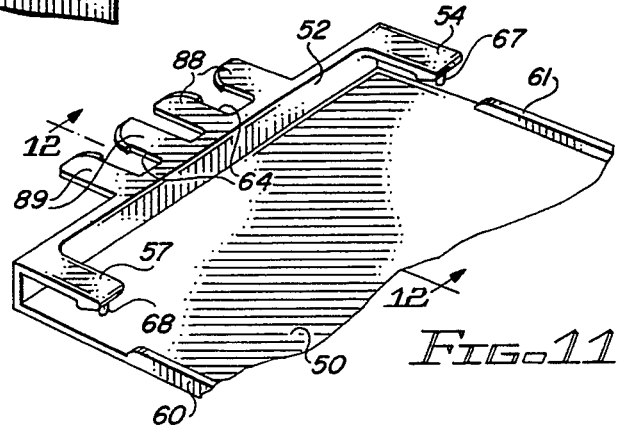
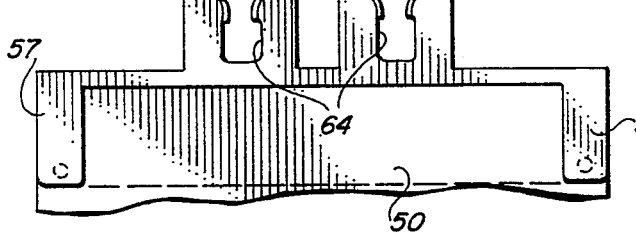
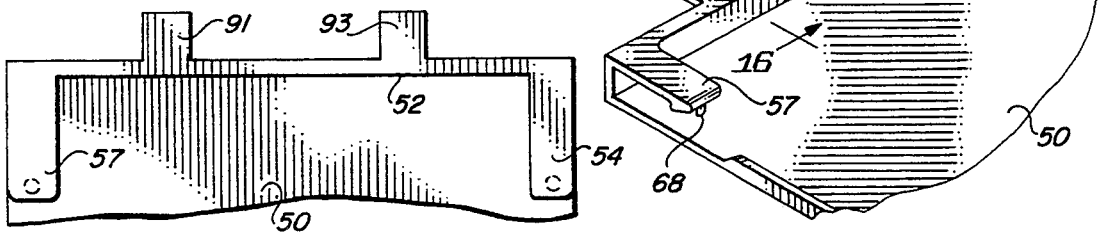

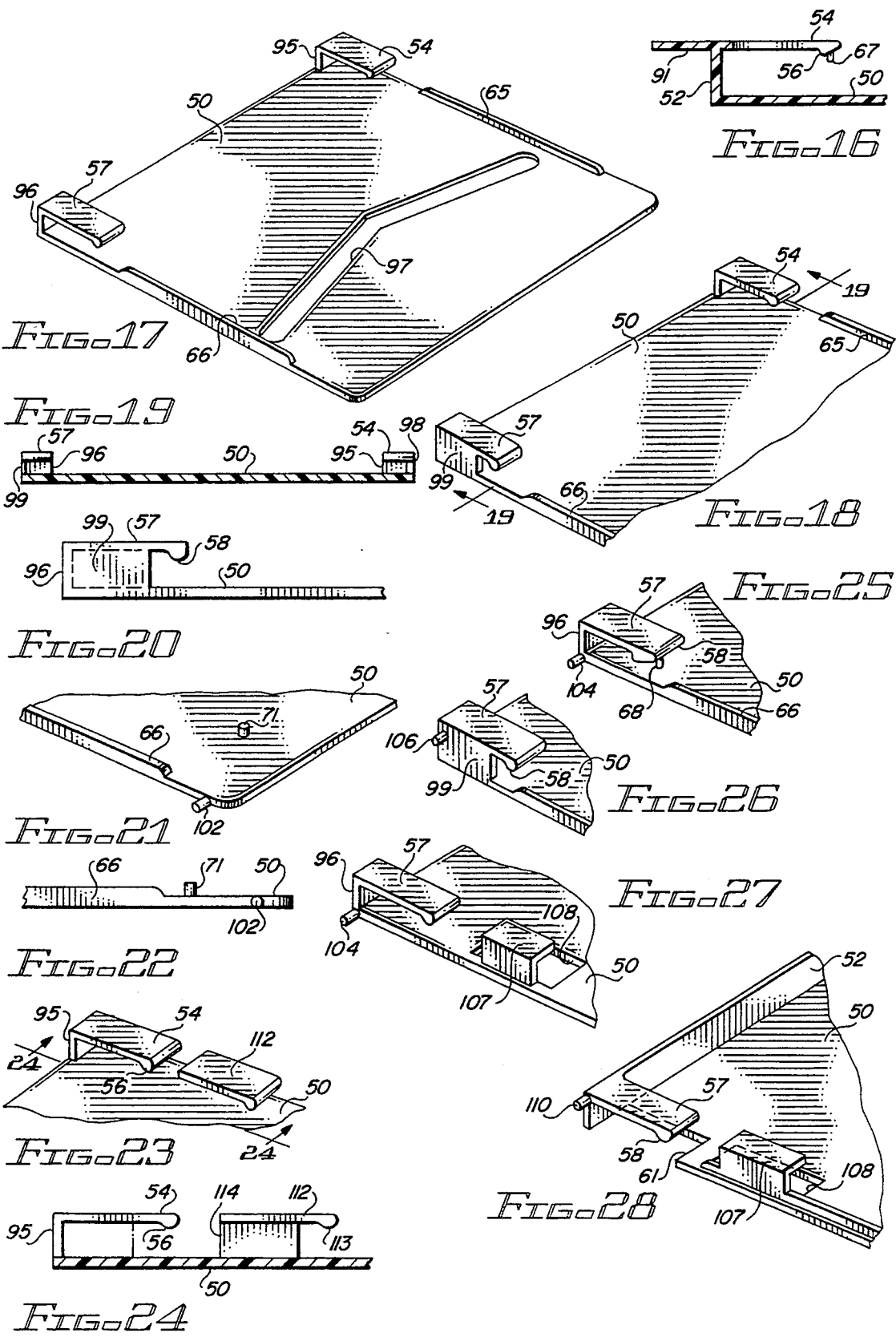

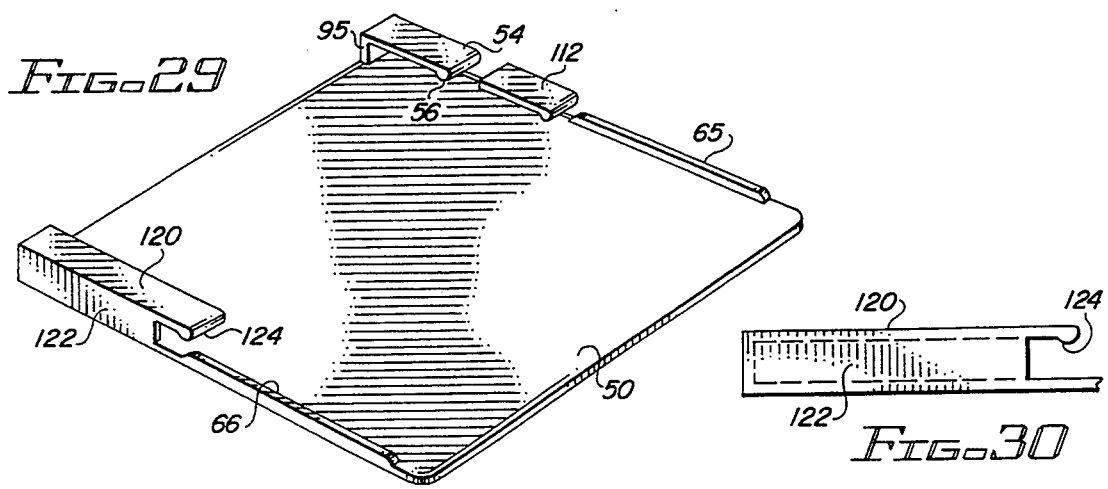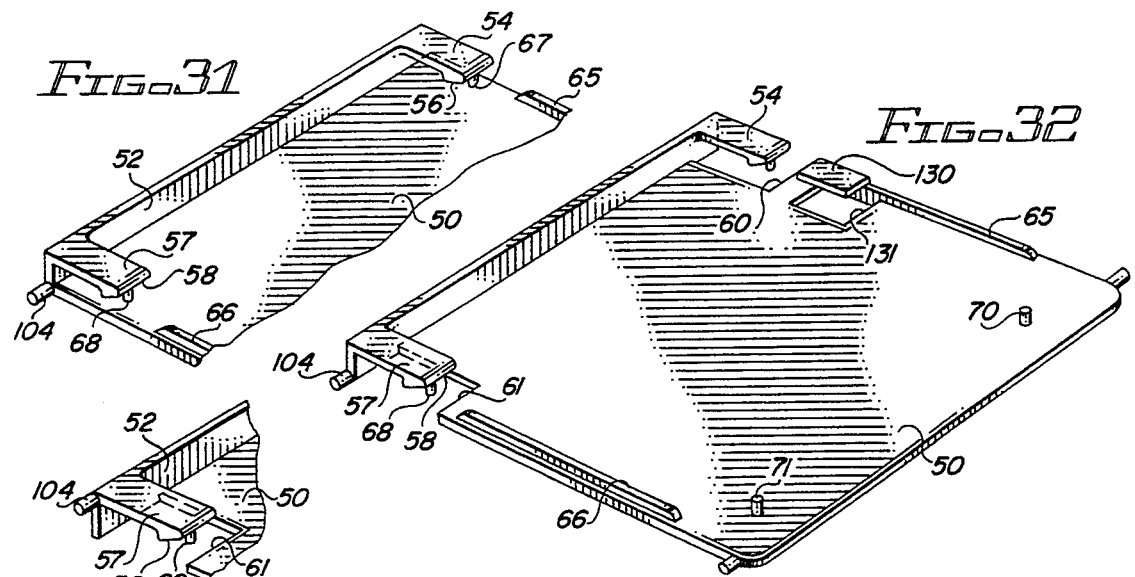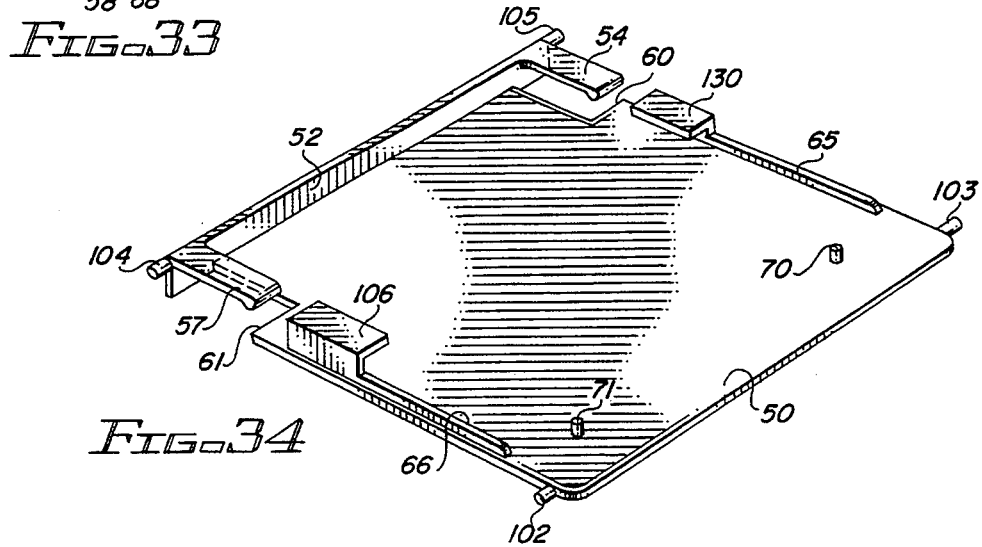

STORAGE HOLDER DEVICE

BACKGROUND

With the ever increasing popularity of personal computers, CD players, CD data storage disks and the like, a need exists for conveniently storing and displaying the program and data computer diskettes, music CD's and data storage CD ROM's. The disks used for computers and compact disks (CD's), whether used for data storage or music/video applications, are lightweight and relatively small. Popular computer data storage disks have a three and one-half inch diameter and are packaged in a rigid square plastic housing. Other popular sizes are 5¼" and 8" floppy disks, assembled into a relatively thin paperboard holder for use.

All of these disks and CD's are relatively thin, flat objects. This makes their storage and subsequent retrieval somewhat difficult. If such disks are stacked flat on a shelf, they are subject to damage. Because these disks are so thin, readable edge labeling is impractical. This difficulty in providing edge labeling to permit identification of such disks and CD's also is present when they are placed on edge on a shelf, or in a storage box. Typically, computer floppy disks and CD's are provided with a stick-on label near their upper edge for purposes of identification. Since this label is on the flat surface, it is necessary to view this surface in order to determine what is contained in the disk.

Storage files for computer diskettes, CD's and similar articles have been developed. Two somewhat similar storage files are disclosed in the United States patents to Long U.S. Pat. No. 4,641,897 and Wolters U.S. Pat. No. 4,776,482. In both of these patents, an open-topped box or tray is provided, in which the lower edges of the computer disks are supported by the bottom of the tray, or are supported on a grooved rack or the like placed in the bottom of the tray. Dividers then are placed between the disks; and these dividers may be provided with appropriate labels for identifying the disks. In both of these patents, the dividers may be moved or tilted to permit viewing of the disks in the file. In neither of these devices, however, are the disks separately held in any type of holder.

A variation of the devices disclosed in the Long and Wolters patents is provided in the United States patent to Sacherman U.S. Pat. No. 4,781,292. This patent also is directed to a file for displaying compact discs, cassettes or other objects. The file includes an open-topped elongated tray, in which a plurality of rotatable pockets are mounted in the bottom of the tray. Each of these pockets accommodates a bottom of the disk which is to be stored and displayed in the tray. The disk itself then extends out of the top of the tray. Clamping ribs are integrally formed in the pockets to cause a friction fit with the bottom of the compact disc or cassette, which is held in the pocket. Viewing of the cassettes then may be accomplished by tipping them forward (from a reverse tipped storage position) so that they can be viewed sequentially.

Another patent, which is similar in construction to the device of Sacherman, but is designed for holding and displaying computer floppy disks, is the device of the United States patent to Gutierrez U.S. Pat. No. 5,027,950. The device disclosed in the Gutierrez patent comprises a base, into which pivotal molded plastic disk holders are mounted. Each of the disk holders has a pocket in it, into which the bottom of the disk is inserted. The disk itself is exposed over approximately the top two-thirds of its height where it extends above the pocket into which the bottom or base of the disk is inserted. The base and pivoting holders of the Gutierrez patent are of a multiple part construction, which is relatively expensive and complex.

A different approach to the storage of computer disks is provided in the device disclosed in the United States patent to Beleckis U.S. Pat. No. 4,426,007. The device of this patent is a multiple part storage file for computer disks. In this device, storage of the disks is provided by mounting them on one edge in a friction fit pocket, which in turn is pivoted on a binder-like spine. Consequently, the disks may be rotated in this spine much like the pages of a book. The pockets, into which the edges of the disks are inserted, exert a spring-like pressure against the disks to prevent them from accidentally slipping out of the pockets.

Another approach for the storage of computer disks, particularly directed to the storage of three and one-half inch diskettes, is disclosed in the two U.S. patents to Behrens U.S. Pat. Nos. 4,884,691 and 4,940,142. The devices disclosed in these patents include resilient pressure elements, which engage complementary recesses in the edge or side of the diskette to hold the diskette in a pocket accommodating either the bottom or one edge of the diskette. The structures, which are disclosed in these patents for accomplishing this result, require complicated molds in the manufacture and require that no changes in the external configuration of the housing for the diskettes be made in the future. If such changes should be made, the holders of the Behrens patents would be rendered unusable.

It is desirable to provide a storage holder for storing relatively thin flat objects, which overcomes the disadvantages of the prior art, which is inexpensive to make, simple to use, and effective in protecting the disks stored in it.

SUMMARY OF THE INVENTION

It is an object of this invention to provide an improved storage holder for storing relatively thin flat objects.

It is another object of this invention to provide an improved storage holder particularly suited for the storage of computer disks and compact discs.

It is an additional object of this invention to provide an improved storage holder for storing thin flat objects, which is inexpensive and easy to use.

It is a further object of this invention to provide an improved computer disk storage device, which is fabricated out of a single piece of molded plastic material.

In a preferred embodiment of the invention, a storage holder for storing relatively thin flat objects comprises a main body member. The body member has a generally rectangular configuration, the dimensions of which are selected to be greater than the corresponding dimensions of a thin flat object to be stored in it. Objects are intended to be stored generally vertically, resting on a projection which extends substantially perpendicularly outwardly from the front face of the body member. An object to be stored in the storage holder is placed on the front face of the body member with one side resting on the projection. An object holding finger is attached to the body member and is spaced from the front face of the body member. This holding finger extends over the front face to retain the object to be stored by pressing it against the front face of the body member. First and second guide members are provided on opposite sides of the body member to provide lateral support for an object stored in the holder, and further facilitate insertion of the object into the storage holder.

BRIEF DESCRIPTION OF THE DRAWINGS

FIG. 1 is a top perspective view of a preferred embodiment of the invention;

FIG. 2 is a cross-sectional view taken along the line 2—2 of FIG. 1;

FIG. 3 illustrates a variation of the embodiment shown in FIG. 1;

FIG. 4 illustrates the variations of FIG. 3 in a stacked relationship;

FIG. 5 is a perspective view of the manner of using devices in accordance with the embodiment shown in FIG. 3;

FIG. 6 is a top perspective view of a variation of the embodiment of FIG. 1;

FIG. 7 is a cross-sectional view taken along the line 7—7 of FIG. 6;

FIG. 8 illustrates a variation of a portion of the embodiment of FIGS. 1 and 6;

FIG. 9 is a cross-sectional view taken along the line 9—9 of FIG. 8;

FIG. 10 is a top view of the portion shown in FIG. 8;

FIG. 11 is a top perspective view of a variation of a portion of the embodiment shown in FIG. 1;

FIG. 12 is a cross-sectional view taken along the line 12—12 of FIG. 11;

FIG. 13 is a top view of the portion shown in FIG. 11;

FIG. 14 is a top perspective view of a portion of another variation of the embodiment shown in FIGS. 1 and 11;

FIG. 15 is a top view of the portion shown in FIG. 14;

FIG. 16 is a cross-sectional view taken along the line 16—16 of FIG. 14;

FIG. 17 is a top perspective view of another embodiment of the invention;

FIG. 18 is a variation of a portion of the embodiment shown in FIG. 17;

FIG. 19 is a cross-sectional view taken along the line 19—19 of FIG. 18;

FIG. 20 is an enlarged view showing details of a portion of the embodiment shown in FIG. 18;

FIG. 21 is a partial view of the embodiment of FIG. 1 illustrating a variation of that embodiment;

FIG. 22 is a side view of the variation shown in FIG. 21;

FIG. 23 illustrates another variation of the embodiment shown in FIG. 17;

FIG. 24 is a cross-sectional view taken along the line 24—24 of FIG. 23;

FIG. 25 is a modification of the embodiment shown in FIG. 17;

FIG. 26 is a modification of the embodiment shown in FIG. 18;

FIG. 27 is a further modification of the embodiment shown in FIG. 25;

FIG. 28 is another modification of the embodiments shown in FIGS. 1, 11, 17 and 26;

FIG. 29 is a top perspective view of another embodiment of the invention;

FIG. 30 is an enlarged detailed side view of a portion of the embodiment shown in FIG. 29;

FIG. 31 illustrates a variation of the embodiment shown in FIG. 29;

FIG. 32 is a top perspective view of a further variation of the embodiment shown in FIG. 29;

FIG. 33 is an enlarged detail of a variation of the embodiment shown in FIG. 32;

FIG. 34 is a top perspective view of another variation of the embodiment shown in FIG. 32;

DETAILED DESCRIPTION

Figure 35:
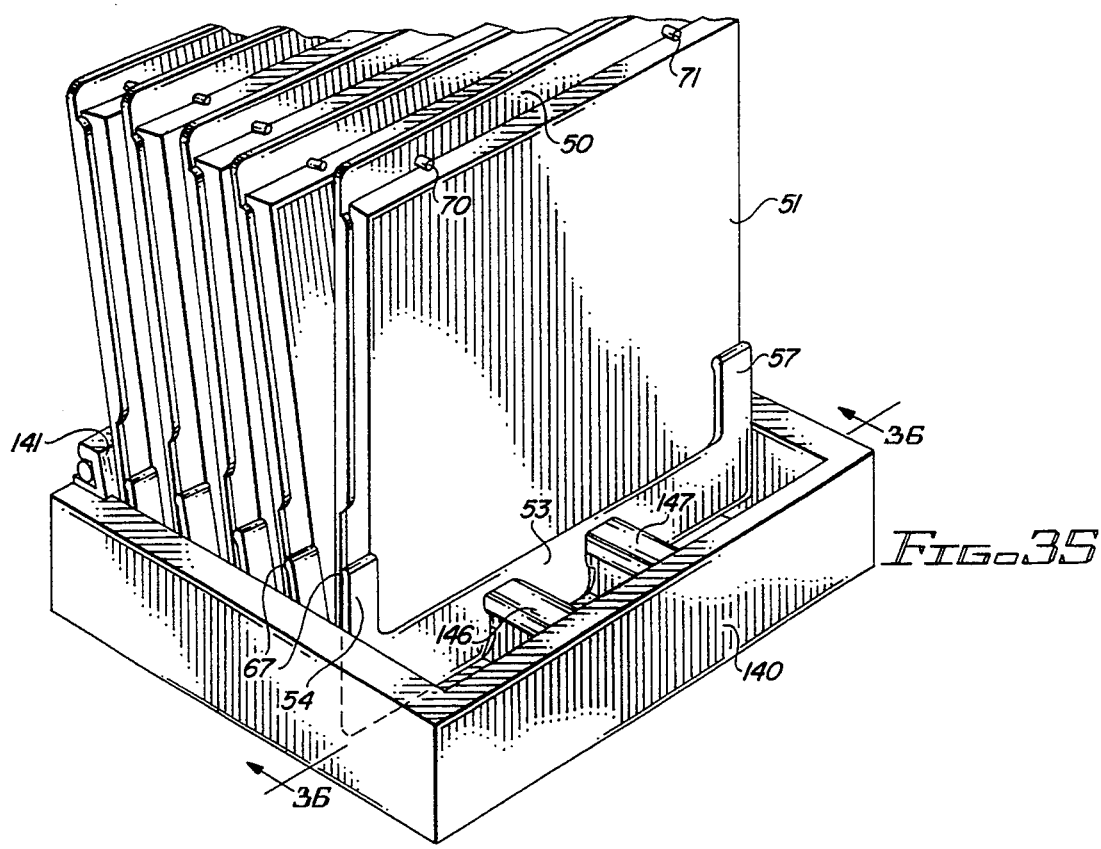
FIG. 35 illustrates the manner of use of the embodiments shown in FIGS. 1 through 13.

Reference now should be made to the drawings, in which the same reference numbers are used throughout the different figures to designate the same or similar components. FIG. 1 shows a preferred embodiment of the invention of a storage holder for storing relatively thin flat objects, such as CD's, computer disks or diskettes. The storage holder comprises a main body panel or back panel 50, which is of a rectangular configuration, and which is greater in both length and width than the corresponding length and width of diskette or CD disc 51 (shown in dotted lines in FIG. 1), which is to be stored in the storage holder.

As is apparent from an examination of FIG. 1, the area which is covered by the disk 51 leaves a region above the disk (to the right in FIG. 1) clear for labeling and marking the panel 50 of the holder, and also for manipulating the holder during subsequent use. At the lower end (upper left as viewed in FIG. 1) of the main panel 50, a bottom support projection or shelf 52 extends across the greater portion of the width of the holder, terminating in a pair of relief areas or cutouts 60 and 61, as illustrated. This shelf 52 is perpendicular or nearly perpendicular to the back panel 50 to support the lower end of a computer disk or CD disc 51 placed in the holder. In order to hold a disk 51 in the holder, a pair of resilient holding fingers 54 and 57 extend over the relief areas or cutouts 60 and 61, respectively, and overlie the plane of the main panel 50. Inwardly projecting cam surfaces or ribs 56 and 58 on the undersides of the resilient fingers 54 and 57, respectively, extend a sufficient distance to engage the surface of a disk 51 inserted between them to seat on the shelf 52. When this is done, the fingers 54 and 57 bend or flex upwardly from the end attached to the extension 53 and shelf 52 to form a resilient force which presses the computer disk or CD 51 against the flat surface of the main body panel 50. This is not a great force. It is selected to be sufficient to frictionally hold the disk 51 in place, as shown in the dotted lines in FIG. 1 (and solid lines of FIG. 35). In addition, pins 67 and 68 on the fingers 54 and 57 operate as side guides to hold a disk 51 between the pins.

The device of FIG. 1 has an extension 53 extending downwardly from the shelf 52 and located in a plane parallel to the plane of the main body panel 50. This extension has a pair of formed notches 64 placed in it to form an engagement feature for fitting the storage holder onto a Rolodex ® card holder or similar device for subsequent utilization. The panel 53 adjacent the notches is thinned to flex when the storage holder is placed on a card holder base.

In addition, a pair of tapered side rails 65 and 66 are located along opposite edges of the main panel 50, and extend outwardly from the face of the panel. These side rails facilitate placement of a disk or diskette 51 into the holder and provide lateral support for the diskette when it is in place in the holder. Similarly, two pin-like top projections 70 and 71 extend outwardly from the face of the main panel 50 over the top of a diskette 51, when it is stored in the holder, to restrict vertical movement of the diskette after it is inserted into the holder. These projections 70 and 71 are selected to have a length which is less than the thickness of the diskette 51 to facilitate ease of removal of the diskette 51 from the holder.

FIG. 2 provides a clearer representation of the relative dimensions of the side rail 65, pin 71 and the resilient finger 57, with the underlying projection 58. It should be noted that the projections 56 and 58 are rounded or beveled adjacent the corresponding areas of the diskette, which they contact. This beveling of these projections facilitates insertion of the diskette 51 into the holder, since they provide a ramp-like head for flexing the fingers 54 and 57 as the diskette 51 is seated against the shelf 52 in the holder.

The amount of flexure for holding the diskette 51 in place, while at the same time permitting ease of insertion and removal of the diskette from the storage holder, is established by the resiliency of the flexible fingers 54 and 57. This is determined by the thickness and length of the fingers 54 and 57, and also by the type of material out of which the holder is made. Ideally, the holder, which is illustrated in FIG. 1, is molded out of a single piece of 1/16" thick ABS plastic, although other types of materials could be used if desired. By using the void areas 60 and 61, the embodiment shown in FIG. 1 may be molded in an injection mold without requiring complicated moving parts in the mold. However, other features, molded by other techniques, may be employed if desired. It also should be noted that materials other than ABS plastic may be used.

Damage to the diskette 51 is prevented by the placement of the flexible fingers 54 and 57 and, in particular, by the placement of the beveled contact projections 56 and 58. For example, when the holder is designed for a 3½" computer diskette, the surfaces 56 and 58 overlap and bear above the stronger side areas of the diskette. They are placed to avoid the delicate metal hatch structure and the write-protect structure in all orientations of the diskette, and also avoid the diskette label areas.

FIGS. 3, 4 and 5 show a variation of the embodiment of FIG. 1. This variation comprises elongated tabs 70 and 71 in place of the similarly numbered pins of FIG. 1, and a raised index tab on the top of the main body panel 50. As illustrated in FIGS. 3, 4 and 5, these raised index tab areas may be offset, and are shown as index tabs 74 and 75 on the left-hand edge and right-hand edge, respectively, of alternating holders 50.

FIG. 6 is a modification of the embodiment of FIG. 1, which has all of the features of the embodiment of FIG. 1, but which additionally has a large cutout or relief rectangle 78 formed in the central portion of the main back panel 50. This is done for the purpose of saving material. Sufficient material remains in the main body panel 50 to provide structural rigidity. Alternatively, this area 78 could be thinned to save material and also to provide a storage recess. The manner of use of the device of FIG. 6 is the same as the one of FIGS. 1 and 2, described above.

FIG. 7 is a cross-sectional view taken along the line 7—7 of FIG. 6, which further illustrates the features of this variation. It should be noted that the cross-sectional view maintains the orientation of the various parts, which also are shown in cross section in FIG. 2.

FIGS. 8, 9 and 10 illustrate a variation of the embodiment of FIG. 1, adding a third or central resilient finger 80 with an underlying beveled projection 81 between the two resilient fingers 54 and 57. The finger 80 also is located above a cutout or relief area 84; so that this embodiment also may be molded in a simple injection mold.

FIGS. 11, 12 and 13 show a variation of the lower (left-hand) end of the embodiment of FIG. 1, which may be substituted for that part of the structure shown in FIG. 1. The remainder of the embodiment of FIG. 1 for the device shown in part in FIGS. 11, 12 and 13 is the same as shown and described previously in conjunction with FIGS. 1 and 2. In the device of FIG. 11, the extension 53 has been eliminated, and pairs of fingers 88 and 89 extend from the edge of the shelf 52 to form the notches 64 for mounting the holder of the embodiments of FIGS. 11, 12 and 13 on a standard Rolodex ® card file holder.

FIGS. 14, 15 and 16 are a perspective view, top view and side view, respectively, of another variation of the embodiment shown in FIG. 1. This variation eliminates the Rolodex ® card holding projections, and instead, replaces those with a pair of rectangular projecting fingers 91 and 93, which may be inserted into correspondingly shaped slots in a suitable base. In all other respects, this variation of the embodiment shown in FIGS. 14, 15 and 16 operates in the same manner as the embodiment described above in conjunction with FIGS. 1 and 2.

It also should be noted that, in conjunction with the embodiments shown in FIGS. 11 through 13 and FIGS. 14 through 16, the resilient fingers 54 and 57 are not placed over cutouts or relief areas 60 and 61, as with the embodiment shown in FIG. 1. Instead, the main body panel 50 extends full width all the way to the shelf area 52. When this structure is used, a single finger also extending full width across the panel may be used, as indicated in dotted lines in FIG. 13. Consequently, to mold the devices, shown in these figures, requires a mold with moving parts to permit formation of the structure as shown. Molds capable of performing this function, however, exist; and for that reason, this variation is illustrated.

FIGS. 17 through 20 illustrate a further variation of some of the parts of the embodiment shown in FIG. 1. In these figures, the shelf 52, which extended across the bottom of the embodiment described previously, has been eliminated, and incorporated in two short projections or legs 95 and 96, which support the resilient fingers 54 and 57, respectively. It is apparent that when a diskette 51 or CD disc is placed on the holder of FIG. 17, the lower edge will rest against the projections 95 and 96. In all other respects, the device shown in FIGS. 17 through 20 functions in the same manner as described above for the device of FIGS. 1 and 2. If the holder is used to store diskettes or CD's in envelopes or sleeves, a relief slot 97 is provided to facilitate removal of the diskette from the envelope as it is being removed from the holder, retaining the sleeve in the holder.

In FIGS. 18, 19 and 20, a further variation is provided in the form of side or corner panels 98 and 99, which further cause the lower corners of a diskette 51 inserted into the device to be properly held in place. Once again, the resilient fingers 54 and 57, along with the beveled projections 56 and 58 on them, hold the diskette 51 in place in the device in the same manner as described previously.

FIGS. 21, 22, 25 through 28 and 32 through 34 show variations of the embodiment of FIG. 1, which replace the Rolodex ® file holding notches 64 or fingers 88/89 with laterally extending pivot pins. These pivot pins may be located at the top of the diskettes, such as the pin 102 shown in FIGS. 20 and 21, illustrative of the upper right-hand corner of the holder when it is viewed from the front and in place in a suitable base, or they may be laterally extending pins 104, 106 or 110 located at the bottom of the holder, as illustrated in FIGS. 25, 26 and 28, respectively. These latter figures all show the lower right-hand corner of a variety of different configurations of devices employing the features described above in conjunction with FIGS. 1 through 20. The particular location of the laterally extending pivot pins 104, 106 or 110, as illustrated in FIGS. 25 through 28, is selected in accordance with the characteristics of a mounting base with which the storage holder is to be used.

The top pivot pins 102 and 103 may be used alone, or in combination with pins 104, 106 or 110. The pins 102 and 103 also may have a tab-like configuration (not illustrated) by which the holder can be manipulated in a base.

FIGS. 27 and 28 additionally show an auxiliary guide member 107, which extends from the edge of the panel 50 over a cutout or relief area 108 to further assist in the lateral support of a diskette which is stored in the holder. FIGS. 23 and 24 show another variation on the opposite edge, in the form of a second resilient finger 112 with a beveled projection 113 for engaging the surface of a diskette or the like inserted into the holder. In FIG. 24, a cross-sectional view more clearly shows the details of the manner in which the finger 112 is supported along its side by means of a panel 114 extending from the edge of the main body panel 50.

FIGS. 29 and 30 illustrate a combination of different ideas which may be incorporated into the invention. On the upper side, as viewed in FIG. 29, the variation of FIGS. 23 and 24 is illustrated. On the lower side (as viewed in FIG. 29) an extended finger 120 has the end with beveled projection 124 located transversely across the main body panel 50 from the resilient finger 112 on the opposite side. A vertical support panel 122 is provided along a portion of the length of the finger 120 to provide additional lateral support for a diskette placed in the device shown in FIG. 29. This embodiment employs the support projections 95 and 96 for the support of the lower end of a diskette 51, which is placed in the device.

The devices shown in FIGS. 14 to 20, 29 and 30 are intended for use in conventional storage boxes, which do not have any mating retaining members in them. Consequently, these devices do not have any lateral pins or extensions on them.

FIGS. 31, 32, 33 and 34 are variations of the devices shown in FIGS. 11 through 15, which eliminate the projections or fingers extending from the lower end of the shelf 52, but instead employs laterally extending pins 104 and 105 on the lower end, and pins 102 and 103 on the opposite edges at the top or upper end of the storage device. In addition, lateral support for a diskette placed in the device is provided by means of the overlying members 107 and 130, which have been described previously. In FIG. 32, the member 130 is shown overlying a relief area 131. All of these components, however, are shown together in the variation illustrated in FIG. 34, which however, does not have the relief area 131.

Figure 36:
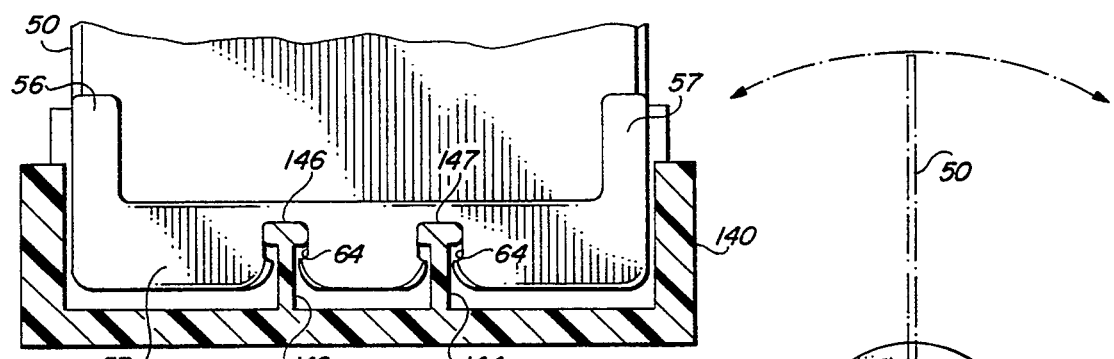
FIG. 36 is a cross-sectional view taken along the line 36—36 of FIG. 35.
Figure 37:
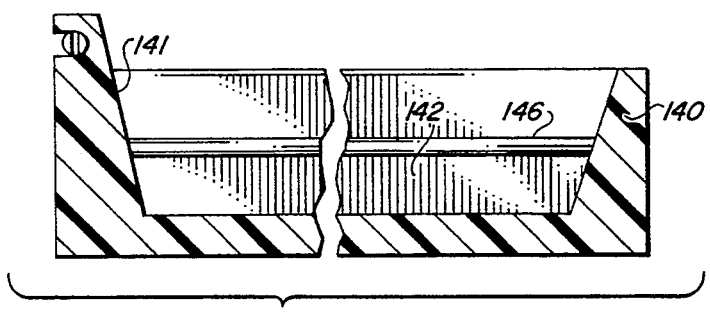
FIG. 37 is a cross-sectional view of a portion of the device shown in FIG. 35.

FIGS. 35 through 37 are directed to a tray or base 140 for use with the embodiments of the invention described in conjunction with FIGS. 1 through 13 above. The tray is in the form of an open-topped holder 140, which has a pair of parallel rails 142 and 144 extending along its length. The tops of these rails are enlarged portions 146 and 147, respectively (shown most clearly in FIG. 36). The notches 64 formed in the panel 53 of the embodiment of FIGS. 1 and 2, or between the fingers 88/89 of the embodiment of FIGS. 11 through 13 are snapped into place, as illustrated, to hold the storage holders in a generally upright position, as indicated in FIG. 35.

The holders may be rocked on their bases to permit insertion and removal of diskettes 51 from individual holders. It should be noted that whenever a diskette is removed from a holder, the holder stays in place, to simplify location of the position from which a diskette 51 has been removed, when it is necessary to return the diskette to its storage holder. In addition, the area of the main back panel 50 of the holder, which is above the top of the diskette 51 (as illustrated in FIG. 35), may be used for placement of a suitable label. If holders of the type shown in FIGS. 3 through 5 are employed, identifying labels are placed on the areas 74 and 75 projecting above the top of the various diskettes 51 which are stored in the holders in the tray.

Figure 38:
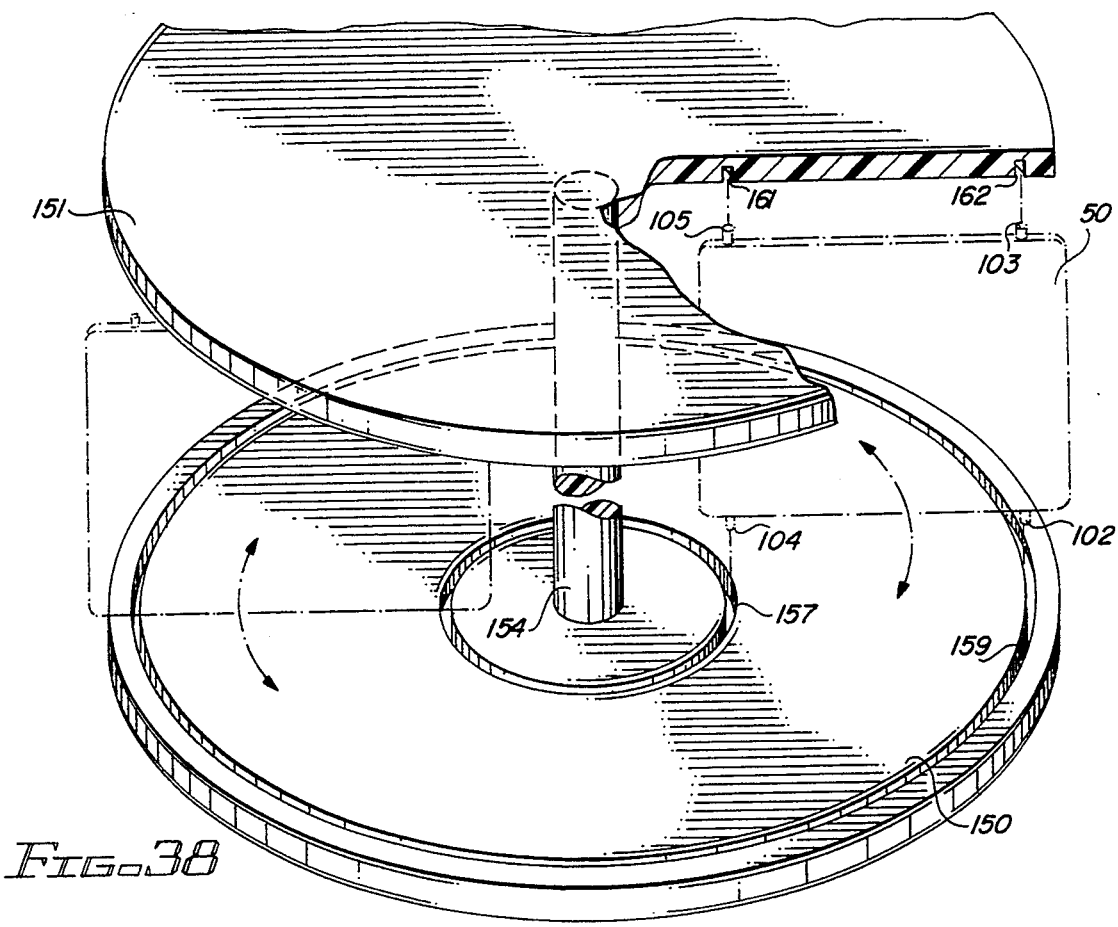
FIG. 38 is a perspective view of another manner of using the embodiments shown in FIGS. 21 through 28 and 31 through 34.

FIG. 38 illustrates a vertical axis storage carousel, consisting of a circular lower base plate 150 and a circular upper plate 151 mounted on a central shaft 154. The shaft 154 and the upper plate 151 may be constructed to permit removal or extension of the plate 151 above the plate 150 to facilitate the removal and insertion of different numbers of diskette storage holders 50, which may be of any of the different types shown in the various drawings, but which employ the laterally projecting pins 104/105 and 102/103 illustrated in the embodiment of FIG. 34. It should be noted that these laterally extending pins may be placed on any of the various embodiments which have been illustrated; so that the holders then may be placed vertically on their sides. The pins 104 and 105 ride in corresponding grooves 157 and 161 in the circular plates 150 and 151, respectively, and the pins 102 and 103 ride in corresponding grooves 159 and 162 in the plates 150 and 151, respectively. The entire unit then may be rotated about the shaft 154, or individual ones of the holders 50 may be moved in the direction of the arrows to facilitate location of particular diskettes to be inserted into and removed from their respective holders.

Figure 40:
FIG. 40 is a cross-sectional side view of the device shown in FIG. 39.
Figure 39:
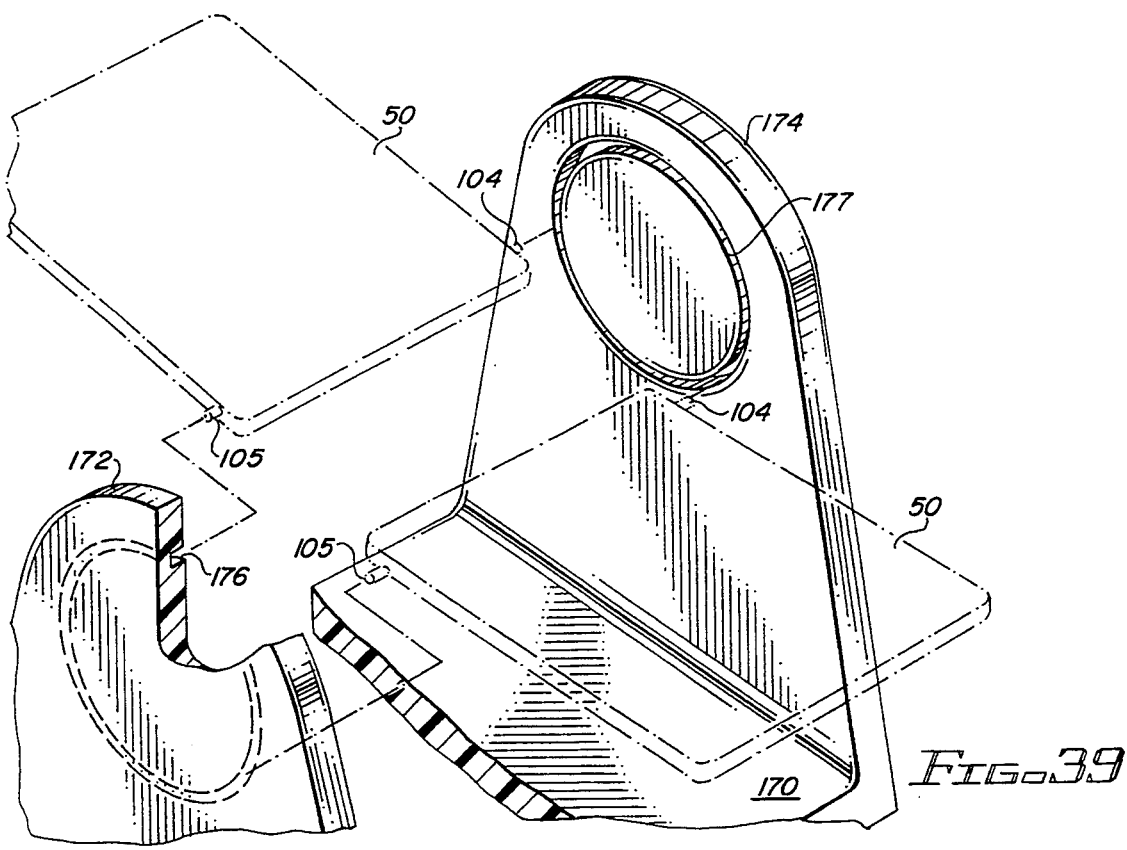
FIG. 39 is a perspective view of yet another manner of using the embodiments of the invention disclosed in FIGS. 21 through 28 and 31 through 34.

FIGS. 39 and 40 illustrate a horizontal axis configuration for storing a number of individual storage holders of the type which have been described in conjunction with the various embodiments of FIGS. 1 through 34. Once again, when the device of FIGS. 39 and 40 is used, the laterally extending pins 104 and 105, located at the bottom of the particular storage holder configuration which is used, are employed in place of the mounting devices shown in the embodiments of FIGS. 1 through 15. As illustrated, the holder of FIGS. 39 and 40 includes a horizontal base 170 with a pair of upright ends 172 and 174. Each of these upright ends has a circular groove 176 and 177, respectively, formed in it; and the pivot pins 104 and 105 of the various storage holders 50, which are to be used with the device, are placed in these respective grooves. The storage holders 50, which then are stored in the device 170/172/174 of FIGS. 39 and 40, may be rotated in the grooves 176 and 177 to facilitate the insertion and removal of various diskettes stored in them. The spring forces provided by the resilient fingers 54 and 57, for example, operating in conjunction with the upper retention pins 70 and 71, serve to hold stored diskettes 51 in place; so that they do not fall out when they are in the upside-down or lowermost position illustrated in FIG. 40.

The various different embodiments of the invention, which have been described above, are to be considered as illustrative and not as limiting. It is apparent that there is a common thread to the different variations which have been disclosed. Other modifications to these embodiments will occur to those skilled in the art, without departing from the true scope of the invention as defined in the appended claims.

I claim:

1. A storage holder for storing relatively thin, flat objects including in combination:
   a main rigid body member having a generally rectangular configuration with a top, bottom, first and second sides, and front and rear faces, with the distances between the top and bottom and between the first and second sides selected to be greater than the corresponding dimensions of an object to be stored in said storage holder;
   first and second resilient spaced-apart object holding fingers attached to said main body member at said first and second sides thereof, respectively, and spaced from the front face of said main body member by a distance which is less than the thickness of an object to be stored in said storage holder, and extending over said front face at said first and second sides only thereof to resiliently engage an object stored in said main body member to press said object against said front face of said body member; said first and second resilient fingers each having guide pins on outer edges thereof aligned with said first and second guide members and extending toward said front face of said main body member for engaging the opposite sides of an object stored in said storage holder;
   a projection at the bottom of said main body member extending substantially perpendicularly outwardly from the front face thereof to support an object stored in said storage holder, said projection comprising a shelf extending across the bottom of said main body member between said first and second sides thereof; and
   first and second guide members on said first and second sides of said main body member for engaging the corresponding sides of an object stored in said storage holder.

2. The combination according to claim 1 wherein said main body member and said first and second object holding fingers are integrally formed from a single piece of material.

3. The combination according to claim 2 wherein said material is plastic.

4. The combination according to claim 3 further including mounting means attached adjacent the bottom of said main body portion for pivotally mounting said storage holder in a container.

5. The combination according to claim 4 further including a space on said main body member adjacent the top thereof located above an object stored therein for facilitating labeling of said storage holder corresponding to a particular object stored therein.

6. The combination according to claim 5 wherein said mounting means includes first and second spaced projections extending downwardly from the bottom of said main body portion.

7. The combination according to claim 1 wherein said first and second object holding fingers, said projection, and said first and second guide members are integrally formed from a single piece of material with said main body member.

8. The combination according to claim 7 wherein the material from which said main body member, said first and second holding fingers, said projection and said first and second guide members are formed is plastic.

9. The combination according to claim 1 further including mounting means attached adjacent the bottom of said main body portion for pivotally mounting said storage holder in a container.

10. The combination according to claim 9 wherein said mounting means includes first and second spaced projections extending downwardly from the bottom of said main body portion.

11. The combination according to claim 1 further including a space on said main body member adjacent the top thereof located above an object stored therein for facilitating labeling of said storage holder corresponding to a particular object stored therein.

12. The combination according to claim 1 further including a second projection extending outwardly from the front face of said main body member near the top thereof for extending over an object stored in said storage holder.

13. The combination according to claim 1 further including relief apertures formed through said main body member between the top and bottom, and first and second sides thereof.

14. A storage holder for storing relatively thin, flat objects including in combination:
   a main rigid body member made of plastic having a generally rectangular configuration with a top, bottom, first and second sides, and front and rear faces, with the distances between the top and bottom and between the first and second sides selected to be greater than the corresponding dimensions of an object to be stored in said storage holder, said main body member having a space adjacent the top thereof located above an object stored therein for facilitating labeling of said storage holder corresponding to a particular object stored therein;
   first and second resilient spaced-apart object holding fingers integrally formed with said main body member from a single piece of material and attached to said main body member at said first and second sides thereof, respectively, and spaced from the front face of said main body member by a distance which is less than the thickness of an object to be stored in said storage holder, and extending over said front face at said first and second sides only thereof to resiliently engage an object stored in said main body member to press said object into engagement with said front face of said body member;

a projection at the bottom of said main body member extending substantially perpendicularly outwardly from the front face thereof to support an object stored in said storage holder;

first and second guide members on said first and second sides of said main body member for engaging the corresponding sides of an object stored in said storage holder; and mounting means comprising a pivot pin extending outwardly from each side of said main body member and attached adjacent the bottom of said main body portion for pivotally mounting said storage holder in a container.

15. A storage holder for storing relatively thin, flat objects including in combination:

a main rigid body member having a generally rectangular configuration with a top, bottom, first and second sides, and front and rear faces, with the distances between the top and bottom and between the first and second sides selected to be greater than the corresponding dimensions of an object to be stored in said storage holder;

first and second resilient spaced-apart object holding fingers attached to said main body member at said first and second sides thereof, respectively, and spaced from the front face of said main body member by a distance which is less than the thickness of an object to be stored in said storage holder, and extending over said front face at said first and second sides only thereof to resiliently engage an object stored in said main body member to press said object against said front face of said body member;

a projection at the bottom of said main body member extending substantially perpendicularly outwardly from the front face thereof to support an object stored in said storage holder;

first and second guide members on said first and second sides of said main body member for engaging the corresponding sides of an object stored in said storage holder; and mounting means comprising a pivot pin extending outwardly from each side of said main body member and attached adjacent the bottom of said main body portion for pivotally mounting said storage holder in a container.

16. A storage holder for storing relatively thin, flat objects including in combination:

a main rigid body member having a generally rectangular configuration with a top, bottom, first and second sides, and front and rear faces, with the distances between the top and bottom and between the first and second sides selected to be greater than the corresponding dimensions of an object to be stored in said storage holder;

first and second resilient spaced-apart object holding fingers attached to said main body member at said first and second sides thereof, respectively, and spaced from the front face of said main body member by a distance which is less than the thickness of an object to be stored in said storage holder, and extending over said front face at said first and second sides only thereof to resiliently engage an object stored in said main body member to press said object against said front face of said body member;

a projection at the bottom of said main body member extending substantially perpendicularly outwardly from the front face thereof to support an object stored in said storage holder;

first and second guide members on said first and second sides of said main body member for engaging the corresponding sides of an object stored in said storage holder; and a tab projection extending outwardly from said first side of said main body member near the top thereof for facilitating manipulation of said storage holder.

* * * * *